United States Patent [19]

Baillie et al.

[11] Patent Number: 4,773,265
[45] Date of Patent: Sep. 27, 1988

[54] METHOD FOR DETECTING LEAKS

[75] Inventors: Lloyd A. Baillie, Homewood; Frank J. Senese, Hickory Hills, both of Ill.

[73] Assignee: Atlantic Richfield Company, Los Angeles, Calif.

[21] Appl. No.: 915,586

[22] Filed: Oct. 6, 1986

Related U.S. Application Data

[63] Continuation of Ser. No. 794,592, Nov. 4, 1985, abandoned, which is a continuation of Ser. No. 538,740, Oct. 4, 1983, abandoned, which is a continuation of Ser. No. 349,226, Feb. 16, 1982, abandoned, which is a continuation of Ser. No. 208,608, Nov. 28, 1980, abandoned.

[51] Int. Cl.$^4$ .............................................. G01F 23/30
[52] U.S. Cl. .......................................... 73/305; 73/313; 340/623
[58] Field of Search .............. 33/DIG. 3, 126, 125 A; 73/243, 305, 313, 319, 322.5, 49.2, 293, 312, 314, 317, 327; 250/576, 577; 340/623, 624, 605, 612, 618, 619, 625; 356/436, 382, 440

[56] References Cited

U.S. PATENT DOCUMENTS

| | | |
|---|---|---|
| 1,955,315 | 4/1934 | Styer ..................................... 73/293 |
| 2,588,672 | 3/1952 | Turvey ................................... 73/301 |
| 2,620,660 | 12/1952 | Goldsmith ............................ 73/293 |
| 2,657,577 | 11/1953 | Falk ....................................... 73/313 |
| 3,498,141 | 3/1970 | Nelson et al. ......................... 73/327 |
| 3,766,395 | 10/1973 | Keir ....................................... 73/293 |
| 4,247,784 | 1/1981 | Henry .................................. 250/577 |
| 4,397,183 | 8/1983 | Ballou et al. ......................... 73/293 |
| 4,453,400 | 6/1984 | Senese et al. ........................ 73/49.2 |
| 4,604,893 | 8/1986 | Senese et al. ........................ 73/49.2 |
| 4,630,467 | 12/1986 | Senese et al. ........................ 73/49.2 |

FOREIGN PATENT DOCUMENTS

| | | |
|---|---|---|
| 1225924 | 9/1966 | Fed. Rep. of Germany ........ 73/319 |
| 80019 | 6/1980 | Japan ................................... 73/293 |
| 74618 | 5/1982 | Japan ................................... 73/293 |
| WO82/04316 | 12/1982 | World Int. Prop. O. ............. 73/293 |

Primary Examiner—William A. Cuchlinski, Jr.
Assistant Examiner—W. Morris Worth
Attorney, Agent, or Firm—Michael E. Martin

[57] ABSTRACT

A method and apparatus are disclosed for measuring changes in relative distance between a float and both a signal source and a detector. Also disclosed is the advantageous use of such an apparatus for detecting losses as little as 0.02 gallons of liquid per hour from a tank otherwise capable of storing 1,000 gallons or more of such a liquid.

1 Claim, 5 Drawing Sheets

FIG. 5
FIG. 6
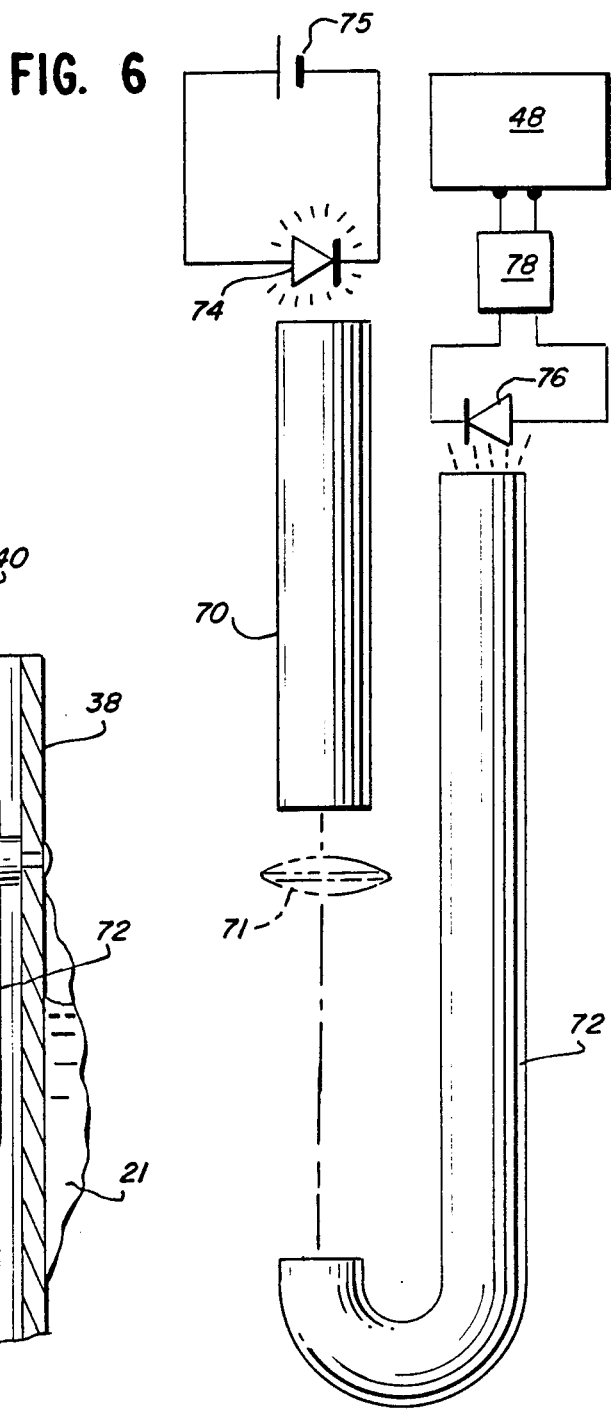
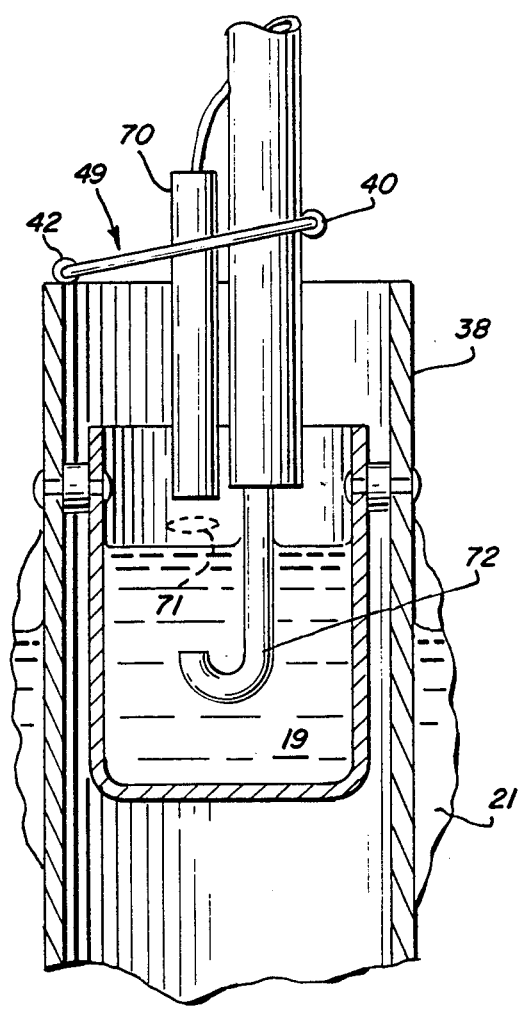

METHOD FOR DETECTING LEAKS

This is a continuation of co-pending application Ser. No. 794,592 filed on Nov. 4, 1985 (abandoned) which is a continuation of application Ser. No. 538,740, filed on Oct. 4, 1983 (abandoned) which is a continuation of application Ser. No. 349,226, filed Feb. 16, 1982 (abandoned), which is a continuation of application Ser. No. 208,608 filed Nov. 28, 1980 (abandoned).

FIELD OF THE INVENTION

This invention relates to the art of detecting a liquid level. More particularly, this invention relates to the art of detecting leaks in liquid storage tanks.

PRIOR ART

To detect a loss of 0.02 gallons of liquid per hour from a storage tank, e.g., an underground gasoline storage tank, by determining changes in the liquid level in the tank can be very difficult. By way of illustrating this difficulty, consider a cylindrical tank half full of liquid containing about 4,000 gallons and oriented on its side having a length of 21.3 feet and a diameter of 8 feet. If one gallon were removed from such a tank, assuming all other relevant variables to be discussed hereinafter are held constant, the level of liquid measured relative to the lowest point of the tank would change from 4 feet to 3.9992 feet, i.e., a change in liquid level of $7.85 \times 10^{-4}$ feet. To observe this change in liquid level is very difficult. Note that even it there were no leaks in this tank, a change in temperature of liquid, e.g., gasoline, of 0.25° F. causing a density change of 0.01139 lb/ft³ cubic feet per pound would result in a change in the observed liquid level of $7.85 \times 10^{-4}$ feet.

Consider also the impact of evaporation. Assume, for example, (1) a tank half filled with gasoline at 70° C., and (2) that the air at about one atmosphere above this gasoline in the tank has substantially no gasoline vapor, then the level of liquid would change by 0.00738 feet as a result of the vapor above the liquid changing from a vapor containing substantially no gasoline vapors to one saturated in gasoline vapors.

Sunmark Industries, a division of Sun Oil Company of Pennsylvania, sells a leak detecting device which relies on the Principle of Buoyancy, i.e., the principle that a body suspended in a liquid is buoyed up by a force equal to the weight of liquid displaced by such a body. A sensor which extends from a sensitive, but rugged balance, and which is partially submerged in the tank fluid detects buoyancy changes corresponding to either an increase or a decrease in the total amount of liquid in a tank.

The Kent-Moore System is a method and apparatus for determining whether there are any leaks in a liquid storage container. One of the steps necessary in carrying out a determination of leaks is to pressurize and fill to excess a storage zone. Details concerning the experimental procedure are published by Kent-Moore Corporation for Model 1000, Tank System Tightness Tester. There are several problems in the Kent-Moore System which result in readings which are not stable.

One source of these problems involves gas bubbles which become trapped within a storage tank or zone. Since most storage tanks are not absolutely level, vapor pockets almost inevitably form as such a tank is filled to excess. Trapped gas bubbles tend to change in volume in response to changes in temperature and/or changes in pressure. During a typical Kent-Moore test, pressure is first increased and then decreased. Trapped gas bubbles first decrease and then increase in volume in response. Equilibrium of the final size of these bubbles requires that the atmosphere of gas within these bubbles reaches a steady state, involving temperature and composition.

Another source of problems arises because the Kent-Moore System uses a pump that necessarily inputs energy into the gasoline tank. As a result of using such a pump, temperature equilibriation is very difficult to achieve. A small leak measured by the Kent-Moore System is the difference between a temperature change times the coefficient of expansion minus the volume lost by a leak.

During tests with the Kent-Moore System, it has been found that an observed volume often fluctuates in both a positive as well as a negative direction. This fluctuation is believed to result from changes in sizes of trapped bubbles.

In summary, the main difficulty of the Kent-Moore System involves the excess filling of the tank which leads to trapped gas bubbles. These gas bubbles, in turn, lead to variations in reading which are not necessarily representative of leaks.

An apparatus or method capable of detecting leaks as easily as that disclosed by Sunmark Industries is both desirable and useful. Further, an apparatus which can detect leaks as well as the method of the Kent-Moore System, but without its draw backs is both desirable and useful.

BRIEF DISCRIPTION OF THE INVENTION

It is an object of this invention to provide a simple and easy to use apparatus and method to detect small leaks, e.g., as little as 0.02 gallons per hour in a tank otherwise capable of storing 1,000 gallons or more.

It is further an object of this invention to provide a method and apparatus capable of compensating for temperature changes so as to distinguish changes in liquid level which are due to leaks from those due to temperature changes.

Other objects of this invention are clear based on the specification.

Briefly, the objects of this invention can broadly be achieved by an apparatus capable of detecting small changes in location of a float means. More specifically, an apparatus of this invention comprises in combination: a signal means for providing or emitting a signal having a characteristic; a detector means for detecting a modulated signal by producing a response signal directly related to the characteristic; a support means for positioning the signal means and the detector means; and a float means comprising a means for floating at a desired depth in a selected liquid and a reservoir means for holding a measuring medium. The float means is movably connectable to the support means. The detector means and the signal means are fixedly connectable to the support means so that the signal when emitted by the signal means will have the characteristic of the signal modulated by the measuring medium. The amount by which the emitted signal is modulated to produce a modulated signal by the measuring medium varies with changes in location of the float means. The detector means is oriented to detect the modulated signal. An example of a signal means is a conventional light bulb. An example of a detector means is a photo resistor which, for example, uses cadmium sulfide. An example of a signal is electromagnetic radiation, such as would be emitted by a conventional light bulb. An example of a characteristic of a signal is intensity.

An example of a measuring medium is a liquid having a k value defined in relation to Beer's Law in the range of about 0.1 to 1,000 reciprocal centimeters. Preferably, the k value of the measuring medium has a value in the range of about 50 to about 200 reciprocal centimeters. By interposing varying amounts of measuring medium between the signal means and detector means the amount by which the signal is modulated can be made to vary. If, for example, a change in location of the float means can be made to result in a change in amount of measuring medium between the detector means and the signal means, then a method for monitoring changes in location of the float means is made possible. This is discussed in more detail hereinafter.

Another embodiment of this invention is a method for detecting a leak in a storage tank containing a liquid. The method comprises determining changes in location of the float means discussed hereinabove.

An improvement to this method further involves locating the float means at a depth approximately equal to $V_L/S_L$ where $V_L$ is the volume of the selected liquid in which the float means is located and $S_L$ is free surface area of the selected liquid. By locating the float means at this depth, temperature variation of the liquid in the storage tank does not change the depth at which the float means floats freely. In other words, a substantially temperature invariant floating position is maintained by the float means.

In still another improvement to the method of this invention, the vapor above the liquid is saturated with the liquid in the storage tank so as to minimize evaporation during a measurement of the location of the float means. Several methods readily understood in the art for insuring that the vapor about the liquid is saturated in the liquid include atomizing so as to fill the vapor above the liquid with small droplets of liquid or coating with a thin layer of the liquid surfaces of the container above the liquid so as to hasten saturation of the vapor above the liquid.

BRIEF DESCRIPTION OF THE DRAWINGS

FIGS. 5 and 6 disclose an alternative embodiment of the present invention employing light transmitting fibers. In FIG. 6, a schematic diagram for changing light received by a light receiving fiber into millivolts is shown.

DETAILED DESCRIPTION OF THE INVENTION

Figure 1:
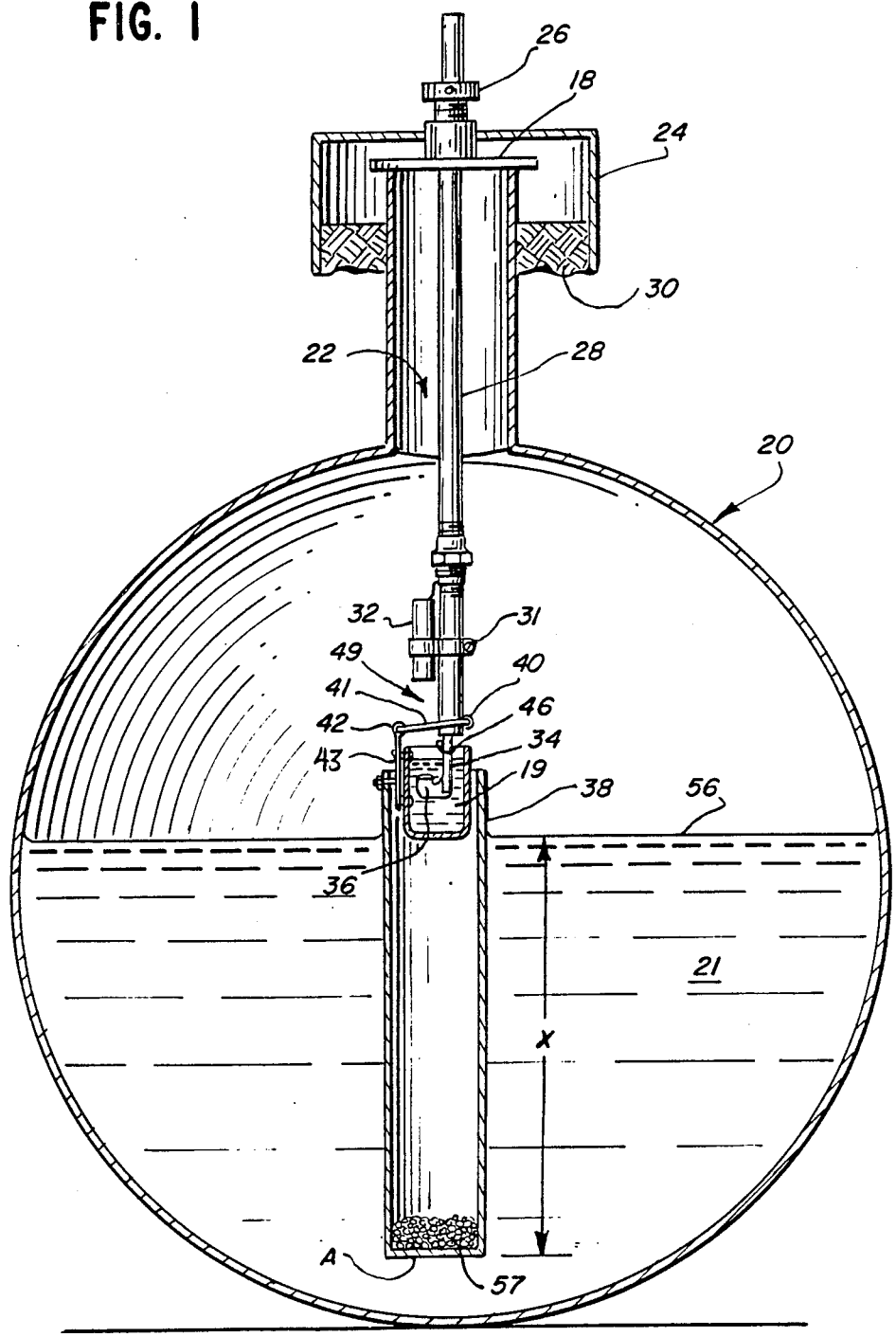
FIG. 1 discloses a side elevation view partially in cross section of a tank containing an embodiment of an apparatus of this invention.

FIG. 1 discloses an underground tank 20 in ground 30. Tank 20 comprises a cover support 24, a height adjustment screw 26, cover plate 18 and a supply opening 22. Connected to height adjustment screw 26 is a tubular support 28. Fixedly, attached to tubular support 28 is a signal source 32 and a detector support 34. Float means 38 is pivotally attached to tubular support 28 by means of a hinge 49 comprising: a first pivot 40, a second pivot 42, a primary lever 41 and a secondary lever 43.

Figure 2:
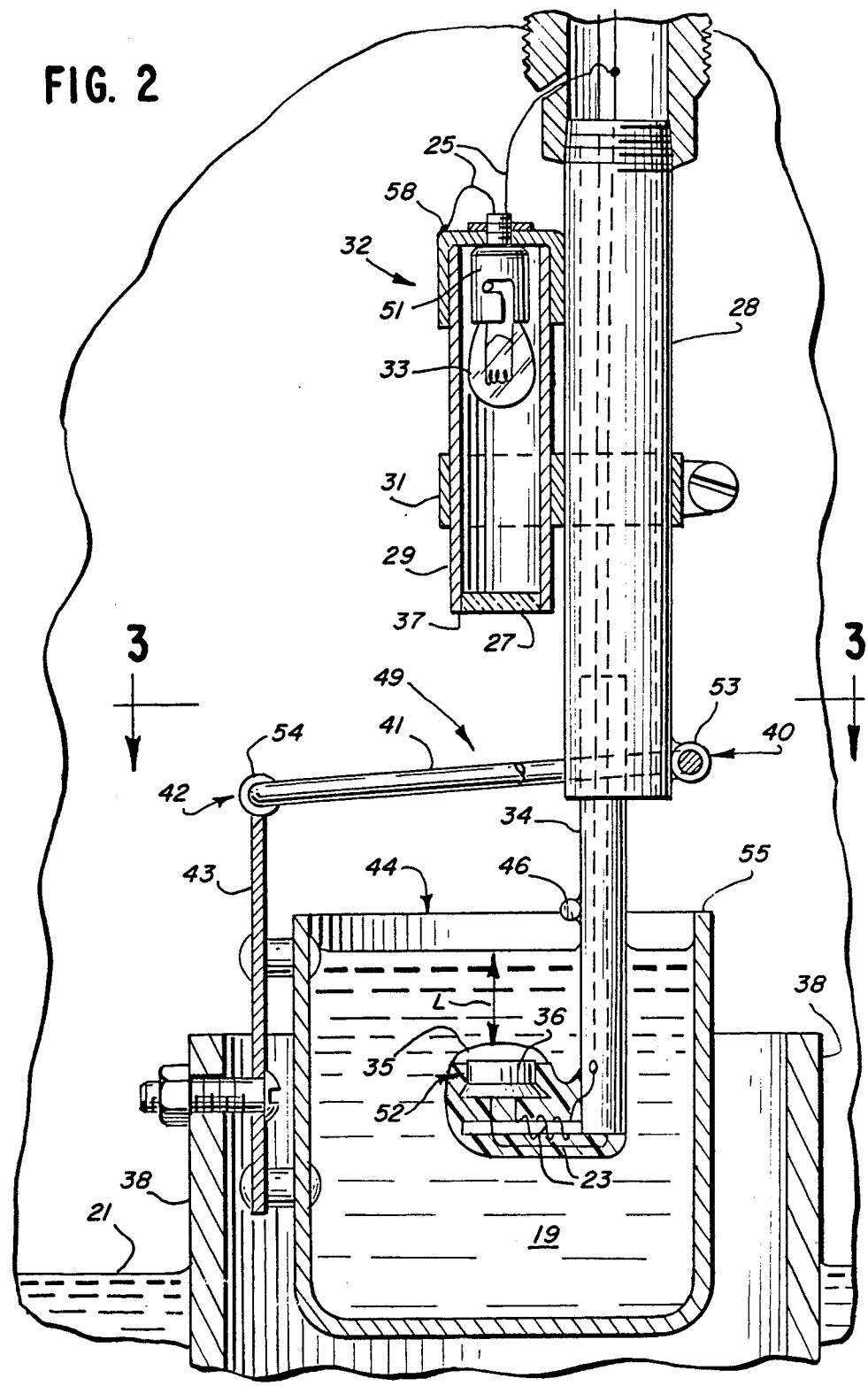
FIG. 2 discloses an enlarged view of a portion of the embodiment of this invention shown in FIG. 1.

FIG. 2 shows an enlarged drawing of a portion of the embodiment of the apparatus of this invention which is shown in FIG. 1. FIG. 2 discloses a signal source 32, a reservoir 44, a photo resistor or detector means 36, a detector support 34, a hinge 49, a float means 38, a band clamp 31, electrical leads 23 and 25, an india ink solution or measuring medium 19 and gasoline or a selected liquid 21. Signal source 32 comprises a housing 29, a plexiglass window 27, a bulb 33, and a bulb socket 51. The electrical connections of signal source 32 are carefully insulated so as to minimize any risks associated with gasoline vapors. Further, the housing 29 and plexiglass window 27 form a vapor tight seal 37 to maintain the compartment containing bulb 33 and bulb socket 51 free from any explosive vapors. Hinge 49 comprises a first pivot 40, a second pivot 42, a primary lever 41 and a secondary lever 43.

Signal source 32 if fixedly attached to tubular support 28 by means of a band clamp 31. A detector support 34 is held in a fixed position relative to tubular support 28. At one end of detector support 34 is located a photo resistor 36 within a sealed compartment 52. A curved glass cover 35 fits over photo resistor 36 or detector means 36 and keeps any india ink solution 19 outside sealed compartment 52. Electrical leads 23 from photo resistor are attached as shown in an electric circuit schematically shown in FIG. 4. One end of leads 23 is directly attached to the mV recorder input 62 and the other end is indirectly connected to the mV recorder input 63 through ground 58. Electrical leads 25 are attached at one end to ground 58 and at the other end to a voltage source (not shown) which must maintain a substantially constant voltage to the filament of bulb 33 so that the intensity of light emitted by bulb 33 does not vary significantly.

Briefly, the operation of the apparatus disclosed in FIGS. 1 and 2 is as follows.

The float means 38 which is movably attached to tubular support 28 is capable of moving relative to tubular support 28. Since float means 38 contains weights 57 (FIG. 1), it maintains a substantially vertical orientation within gasoline 21. Because float means 38 remains in a substantially vertical orientation due to natural buoyancy forces, only one hinge 49 is required although others may be used.

The first pivot 40 comprises a $\frac{1}{4}''$ stainless steel tube 53 which is attached to tubular support 28 and a primary lever 41 which is pivotally mounted within tube 53. Second pivot 42 comprises a $\frac{1}{4}''$ stainless steel tube 54 into which primary lever 41 is inserted and pivotally mounted in a manner similar to that of first pivot 40, and a second lever 43 is fixedly attached to $\frac{1}{4}''$ stainless steel tube 54. The main purpose of hinge 49 is to permit movement of float means 38 relative to tubular support 28. Other arrangements can be used which fulfill the same purpose as hinge 49. Reservoir 44 is fixedly attached, e.g., either directly or indirectly, to secondary lever 43. Similarly, float means 38 is fixedly attached, e.g., directly or indirectly, to secondary lever 43. As float means 38 moves up or down in response to changing buoyancy forces, e.g., due to loss or gain in the amount of gasoline 21 in tank 20, reservoir 44 changes position relative to detector means 36. Since both signal source 32 and detector means 36 are in a fixed position relative tubular support 28, the relative to position of signal source 32 to detector means 36 remains constant throughout changes in location of float means 38. For example, as float means 38 moves upward, reservoir 44 fixedly attached to float means 38 also will move upward relative to tubular support 28. The amount of india ink solution 19 above photo resistor 36 indicated by double arrow "L" will increase as float means 38 moves upward and decrease as float means 38 moves downward relative to tubular support 28. Light from signal source 32 provided by bulb 33 passes through a plexiglass window 27 and between the arms of primary lever 41, then through india ink solution 19 having a thickness of "L" and finally impinges upon photo resistor or detector means 36. The distance "L" as it increases will cause a decrease in the intensity of light picked up and absorbed by photo resistor or detector means 36. Example I discusses in more detail the relationship of the intensity detected by photo resistor 36 and the voltage output from electric leads 23.

Figure 3:
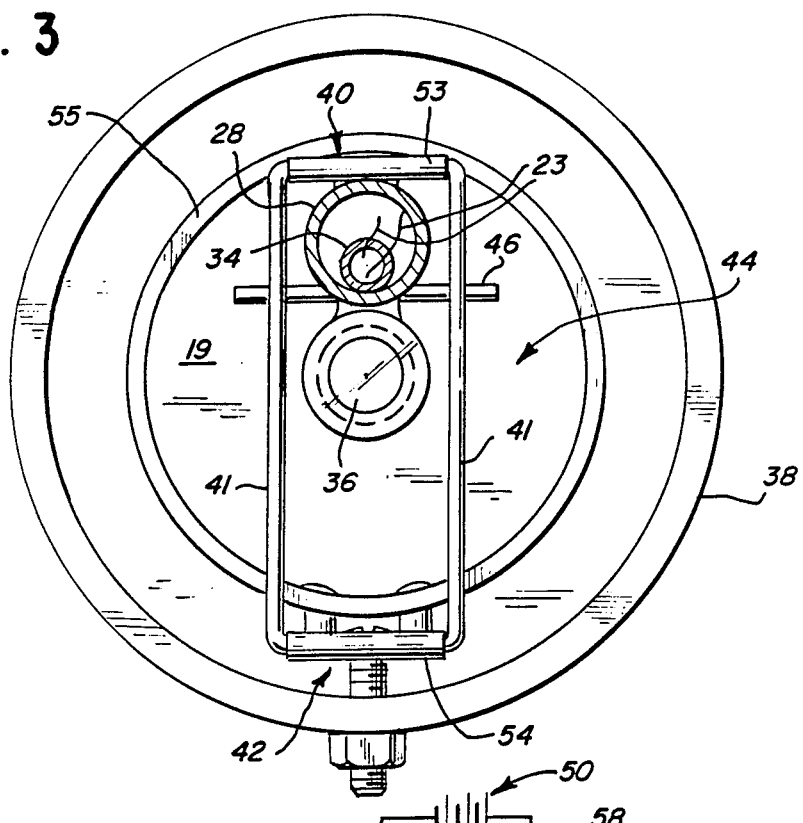
FIG. 3 is a top view along line 3—3 of FIG. 2.

FIG. 3 is a top view along line 3—3 of FIG. 2. FIG. 3 discloses tubular support 28, detector support 34, detector means 36, first pivot 40, second pivot 42, primary lever 41, cross bar 46 and reservoir 44 containing a measuring medium 19. Cross bar 46 fixedly attached to detector support 34 is useful to aid insertion of the device of this invention by limiting the amount of movement around first and second pivots 40 and 42. Movement around first and second pivots 40 and 42 is limited because primary lever 41 contacts cross bar 46 when the maximum amount of counter-clockwise rotation around first pivot 40 occurs. In other words, as the device of this invention as shown in FIG. 2 is withdrawn through supply opening 22, primary lever 41 rotates in a counter-clockwise rotation around first pivot 40. This counter-clockwise rotation continues until primary lever 41 contacts cross bar 46. Since further counter-clockwise rotation is precluded after primary lever 41 contacts cross bar 46, the remaining portion of this invention fixedly attached to secondary lever 43 than begins to move as tubular support 28 moves.

Clockwise rotation around first pivot 40 will be limited due to contact between top surface 55 of reservoir 44 and first pivot 40. This limitation to clockwise rotation is necessary to maintain the proper relationship of hinge 49.

Figure 4:
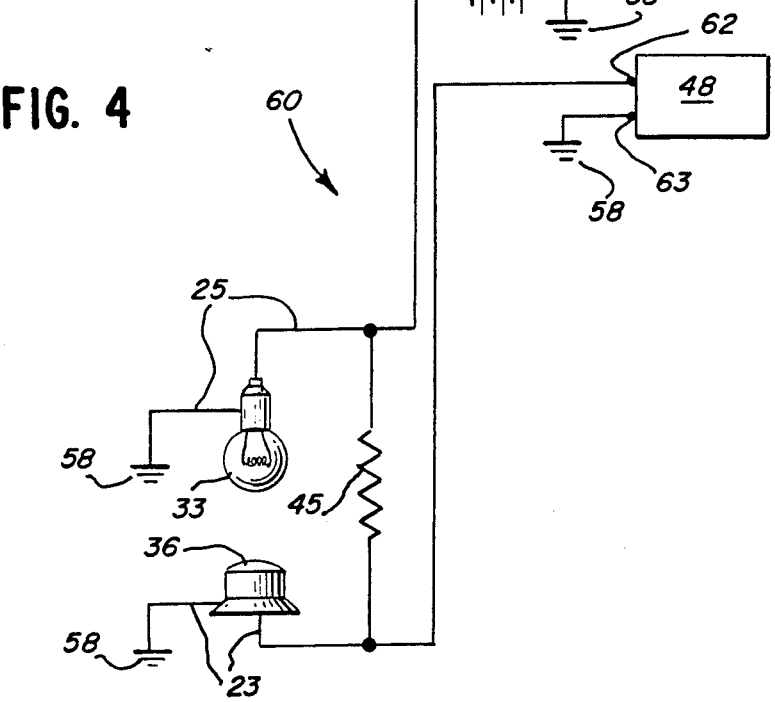
FIG. 4 discloses a schematic diagram of electrical connections from a photo detector to a millivolt (mV) strip chart recorder. The electrical connection converts resistance across the photo detector into millivolts.

FIG. 4 discloses a schematic measuring circuit 60 which includes electrical leads 23 of detector 36. Measuring circuit 60, comprises a constant voltage source or battery 50 and a resistor 45. Resistor 45 and detector 36 are in series with one another. The voltage differences across detector 36 are measured and recorded by means of millivolt recorder 48 on strip chart 61 (not shown). Battery 50, for example, can have a voltage of 1.5 volts when resistor 45 has a resistance of about 100,000 ohms. Detector 36 preferably uses cadmium sulfide.

Measuring circuit 60, shown schematically, converts the resistance across detector 36 into a voltage differential across detector means 36. This voltage differential across detector 36 is measured and recorded by millivolt recorder 48 on a strip chart 61. The voltage source 50 must be substantially constant not only to keep the intensity from bulb 33 substantially constant, but also to keep the total voltage drop across both resistor 45 and detector 36 substantially constant.

The apparent resistance across detector 36 will vary depending upon the intensity of light radiation impinging thereon. The amount of transmitted light radiation reaching detector 36 from light source 33 will vary, all other factors to be discussed hereinafter being equal, logarithmically with the height L of liquid 19 (FIG. 2).

In a preferred embodiment, the transmittance characteristics of measuring medium 19 will follow a simple form of Beer's Law, i.e., $I/I_0 = e^{-kL}$. The k is a constant which cancels out as shown in an example. Carbon black or graphite e.g., in an india ink solution of about one percent (1%), has been found particularly suitable in this invention. The value of k in reciprocal centimeters is preferably in excess of 50. The larger the value of k, the more sensitive is the instrument. If k becomes too large, e.g., much above 1000, minute vibrations can become a serious problem and/or the intensity of transmitted light can become diminished to a point that makes detection difficult. Preferably, k has a value in the range of about 50 to about 200 reciprocal centimeters.

Figure 8:
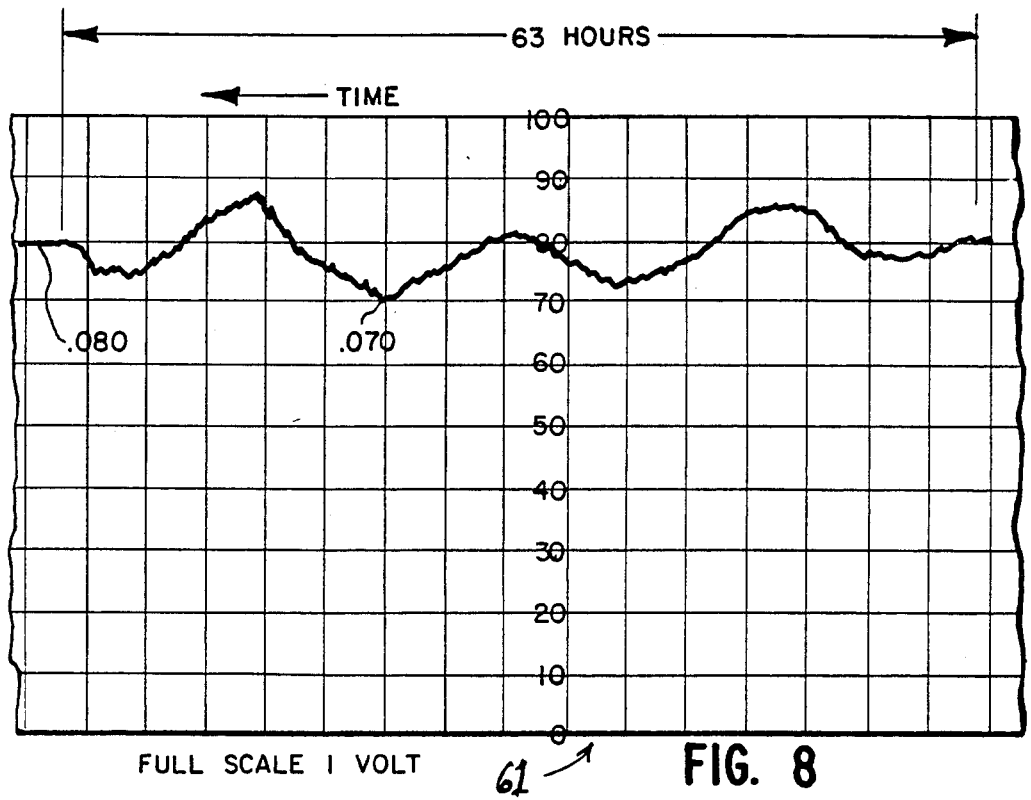

FIGS. 5 and 6 disclose an alternative embodiment to the invention shown in FIGS. 1 and 2. In place of signal source 32 a transmitting fiber 70 is used and in place of detector 36 a receiving fiber 72 is used. Other elements disclosed in FIG. 8 are numbered with those numbers of the same or equivalent elements of FIGS. 1 and 2. Although fiber 70 is indicated to be a transmitting fiber, it may also be a receiving fiber when receiving fiber 72 is alternatively a transmitting fiber. A focusing lens 71 may be inserted between fibers 70 and 72 to provide a collimated beam therebetween.

FIG. 6 is a schematic representation of the alternate embodiment shown in FIG. 5. Disclosed in FIG. 6 are a battery 75, a light emitting diode 74, a transmitting fiber 70, a collimating lens 71 (in phantom outline), an absorbing fiber 72, a photo diode 76, a means 78 for converting current to voltage and millivolt recorder 48.

The device schematically disclosed in FIG. 6 operates as follows. Power from battery 75 causes light emitting diode 74 to emit light which is transmitted by fiber 70. Optionally, a collimating lens 71 collimates the beam so as to minimize undesirable dispersion. Light received by fiber 72 is transmitted to a photo diode 76. The current produced by photo diode 76 is converted into voltage by a two-step electronic circuit. The first step of the electronic circuit collectively shown as box 78 is to convert current into voltage by ways well recognized and understood in the art. Devices useful as transmitting and receiving fibers with couples to transmitting and receiving photo diodes are sold by Skan-A-Matic Corporation, Elbridge, N.Y. A second portion of the circuit 78 converts the voltage produced by the first step of converting current to voltage and amplifies such voltage so as to provide a working voltage capable of driving a millivolt recorder 48. The amount of light received by fiber 72 which passes through collimating lens 71 will depend primarily upon the amount of measuring medium or india ink solution 19 which is between transmitting fiber 70 and receiving fiber 72. The observed voltage on the millivolt recorder 48 will vary in the same manner as in FIGS. 1 and 2 to disclose the relative movement of float means 38 with respect to both tubular support 28 and anything fixed relative to tubular support 28.

It is possible by varying the weights 57 to position float means 38 at a depth so that changes in the height of surface 56 due to temperature changes of the gasoline will not cause float means 38 to change its position. The depth required to make float means 38 invariant to changes in temperature of the gasoline and/or tank will depend upon the particular linear coefficients of expansion for the liquid 21, the tank 20 and the float means 38. This depth is approximately equal to the liquid volume divided by the free liquid surface are 56 (FIG. 1). Derivation of a formula giving this depth is given in more detail in an example herein.

EXAMPLE I

Beer's Law for scatter of light radiation of frequency f through a liquid of thickness L is: $I_f/I_f^0 = e^{-k_f L}$ where $I_f^0$ is the initial intensity of light radiation of a paritcular frequency f; $I_f$ is the intensity of light of frequency f transmitted through a layer of liquid of thickness L; and $k_f$ is a physical constant characteristic of the liquid.

For an india ink solution of about 1%, the $k_f$ of Beer's Law for all frequencies of light from a 100 watt bulb are substantially equal. This avoids any problems from using light having different frequencies and different intensities for each such frequency, i.e. Beer's Law simplifies to $I/I^0 = e^{-kL}$.

Any change in the initial intensity, $I^0$, results in a proportional change in the transmitted intensity, I, so that the ratio of $I/I^0$ is unchanged. Consequently, changes in the intensity of light transmitted by a light source due to factors such as changes in line voltage or age of light source, e.g. bulb 33, do not affect the ratio of $I/I^0$ or the L value observed.

Because of the nature of a photo resistor utilizing, for example cadmium sulfide, the internal resistance, R, of the photo resistor is a constant divided by the intensity of light impinging on the photo resistor. Therefore, the ratio $R_2/R_1$ is equal to the ratio $I_1/I_2$.

If $E_2/E_1$ is equal to $R_2/R_1$, then any change due to system variables such as battery voltage changes, temperature changes and mechanical stresses which do not affect the value of L observed also will not affect the ratio of $E_2/E_1$. This is so because $I_2/I_1$ are only affected by changes in L, provided k remains constant.

Demonstration that:

$E_2/E_1 = I_2/I_1 = R_2/R_1$ for the measuring circuit 60 shown in FIG. 4, wherein $R_1$ = internal resistance of detector 36 when a light of intensity $I_1$ is impinging thereon;
$R_2$ = internal resistance of detector 36 when a light of intensity $I_2$ is impinging thereon;
$E_1$ = the observed millivolt value recorded on a strip chart.
$E_2$ = the observed millivolt value recorded on a strip chart after removal of 1 quart of liquid from tank 20;
$E_w$ = voltage across resistor 45 and detector 36, a constant; and
$R_c$ = resistance of resistor 45, a constant.

$$\frac{E_1}{E_w} = \frac{R_1}{R_1 + R_c} \quad (1)$$

$$\frac{E_2}{E_w} = \frac{R_2}{R_2 + R_c} \quad (2)$$

Equations (1) and (2) are derived based on Ohm's Law, i.e.,
V = iR, wherein

V = voltage,
i = electrical current, and
R = resistance.

from equation (1)

$$(E_1)(R_c) = R_1(E_w - E_1) \quad (3)$$

from equation (2)

$$(E_2)(R_c) = R_2(E_w - E_2) \quad (4)$$

dividing equation (3) by equation (4):

$$E_2/E_1 = (R_2/R_1)[(E_w - E_1)/(E_w - E_2)] \quad (5)$$

since Ew is much greater than $E_2$ and $E_1$
$[(E_w - E_2)/(E_w - E_1)]$ is very close to a value of 1, and therefore equation (5) simplifies to:

$$E_2/E_1 = R_2/R_1$$

Also since $I_2/I_1 = R_1/R_2$ based upon the inherent character of photo resistor 36, therefore, $$E_2/E_1 = R_2/R_1 = I_1/I_2.$$

Assume:
$I_1$ and $I_2$ = intensity of light received by detector 36 at t = 0 and t = 15 hrs, respectively;
$I_3$ = intensity of light received by detector 36 before any gasoline is removed; and
$I_4$ = intensity of light received by detector 36 after 1 quart of gasoline 21 has been removed from a tank 20;
then by Beer's Law for an India Ink Solution:

$$\ln(I_1/I_2) = \ln(E_2/E_1) = k(L_2 - L_1) = kh_1$$

$$\ln(I_3/I_4) = \ln(E_4/E_3) = k(L_4 - L_3) = kh_2$$

$$V_1 = Sh_1$$

where:
$V_1$ = volume of liquid removed for a change in liquid level of $h_1$;
$V_2$ = volume of liquid removed for a change in liquid level of $h_2$; and
S = surface area of free surface 56 in tank 20 shown in FIG. 1.

$$\frac{\ln(E_2/E_1)}{\ln(E_4/E_3)} = \frac{k\frac{[V_1]}{[S]}}{k\frac{[V_2]}{[S]}} = \frac{V_1}{V_2} = n$$

if $V_2$ is a known volume, say 1 quart and defining $V_1/V_2$ equal to n, then n is the number of quarts in $V_1$.

$$\ln(E_2/E_1) = n \ln(E_4/E_3) = \ln(E_4/E_3)^n$$

therefore, $$E_2/E_1 = (E_4/E_3)^n$$

Figure 7:
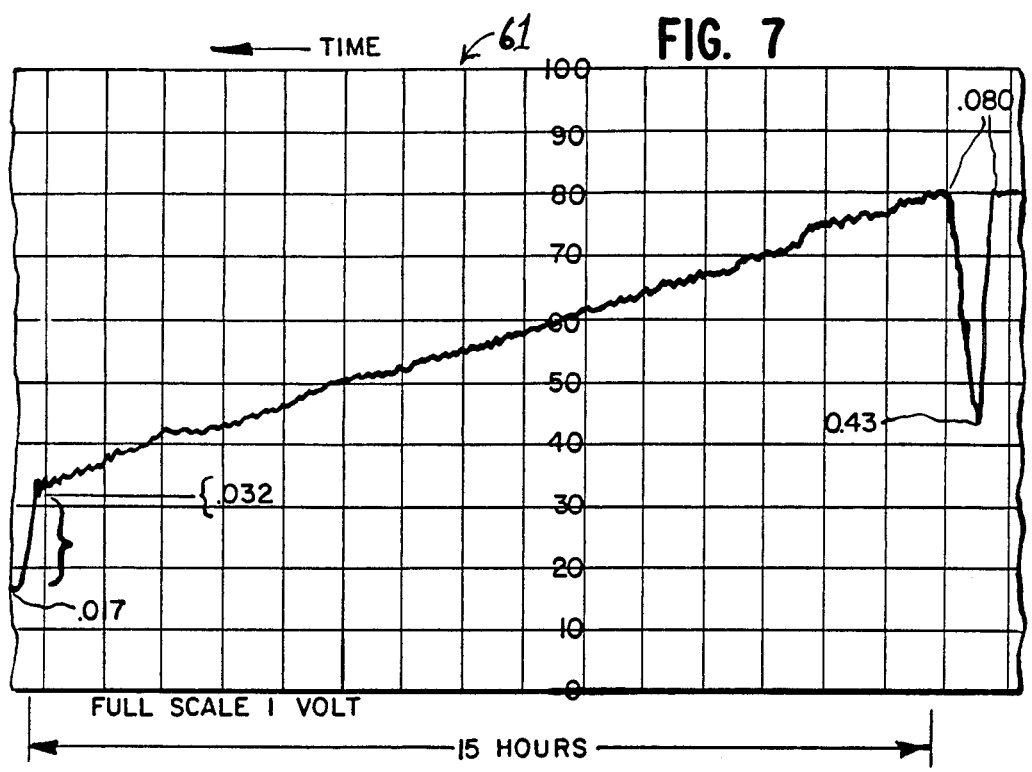
FIGS. 7 and 8 are millivolt strip chart traces produced during two experiments employing an apparatus of this invention. The details concerning these experiments are discussed in the examples.

In FIG. 7, $E_1$ is 0.80 volts, as recorded on strip chart 61, and corresponds to some initial intensity $I_1$ received by detector 36 at time zero; $E_2$ is 0.32 volts at some time 15 hours after the start of the experiment. At time zero, it is necessary to saturate the vapor above surface 56 with gasoline or whatever the stored liquid 21 is to avoid changes in level of liquid 21 due to evaporation. This problem is discussed in the Specification in a paragraph bridging pages 2 and 3. Also at time zero, 1 quart of gasoline 19 was removed and the initial and final volts recorded on strip chart 61. Initially $E_3$ and $E_4$ were recorded as 0.80 and 0.43 volts, respectively. After 15 hours, 1 quart of liquid 19 was removed and the initial and final volts recorded for another $E_3$ and $E_4$ of 0.32 and 0.17 volts, respectively.

Using the formulas shown herein:
$E_4/E_3 = 0.538$ and $0.531$ for an average value of $0.534$
Therefore, $$0.32/0.80 = (0.534)^n$$

n = about 1.460 quarts in 15 hours.

The rate of the gasoline loss is about 0.024 gallons/hour.

EXAMPLE II

A determination of response signal stability for the apparatus shown in FIGS. 1 and 2 was run by causing the float means 38 to rest on the bottom of tank 20. In this situation, there is no movement of float means 38 relative to detector 36.

In FIG. 8, 63 hours elapse between an initial recorded value of 0.80 volts and a final recorded value of close to 0.80 volts. A maximum drift of 0.70 from the 0.80 value initially and finally recorded occurred at some point during the 63-hour interval. There was no apparent preferential drift direction. Clearly depending upon the number of hours, e.g., 1 or 12 hours, between the initial value of 0.80 and the drift value 0.70, the apparent loss of liquid would be 0.212 quart/hour or 0.018 quart/hour.

EXAMPLE III

When a floating means of this invention is located at a depth approximately equal to the liquid volume divided by the liquid surface area, the float means will remain stationary even during changes in temperature involving the liquid in the tank and the float means itself.

The derivation of the formula indicating the depth at which the float means will remain stationary even during changes in temperature is as follows:

The force against a submerged float means of area A shown in FIG. 1 will be:

(1) $F = \phi A x$, where F is force, $\phi$ is liquid density, and x shown in FIG. 1 is the depth of the float means below the surface. All three of these factors will be affected by temperature; therefore, when we differentiate with respect to temperature T:

$$dF/dT = \phi x(dA/dT) + \phi A(dx/dT) + Ax(d\phi/dT) \quad (2)$$

Let $c_1$ be the linear coefficient of expansion of the liquid, $c_2$ the linear coefficient of expansion of the tank, and $c_3$ the linear coefficient for the float means. The volumetric coefficient of expansion of the liquid will then be approximately $3c_1$; the volumetric coefficient for the tank will be approximately $3c_2$; and the area coefficient of the pressure sensor will be approximately $2c_3$.

The reason for approximately $3c_1$, $3c_2$ and $2c_3$ is as follows. $c_1$ or $c_2$ is equal to a very small constant wherein:

$(1+c_1)$ or $(1+c_2) \times$ (Dimension at $T_1$) $\times (T_2-T_1) =$ Dimension at $T_2$; for $c_1$ of the liquid or $c_2$ of the tank, the new volume at $T_2$ for the liquid and tank are respectively:

$(1+c_1)^3 \times (T_2-T_1)^3 \times$ (Dimension at $T_1)^3$ and
$(1+c_2)^3 \times (T_2-T_1)^3 \times$ (Dimension at $T_1)^3$.

However, $(1+c_1)^3 = 1^3 + 3c_1 + 3c_1^2 + c_1^3$.

Since both $c_1$ and $c_2$ are much smaller than 1, $$3c_1 + 3c_1^2 + c_1^3 \approx 3c_1$$

$$3c_2 + 2c_2^2 + c_2^3 \approx 3c_2.$$

Finally, for area A, $(1+c_3)^2 \times$ (Area at $T_1) \times (T_2-T_1) =$ Area at $T_2$ where $(1+c_3)^2 = 1^2 + 2c_3 + C_3^2$ Since $c_3$ is much smaller than 1, $$2c_3 + c_3^2 \approx 2c_3$$

We can now express $d\phi/dT$, $dA/dT$, and $dx/dT$ in terms of these coefficients.

$$dA/dT = 2c_3 A \quad (3)$$

$$d\phi/dT = -3c_1\phi \quad (4)$$

The change in liquid height above the sensor dx will be the net change in liquid volume divided by the liquid surface; the net change of liquid volume will be the expansion of the liquid minus the expansion of the tank.

$$dx/dT = (V_L/S_L)(3c_1 - 3c_2) \quad (5)$$

where $V_L/S_L$ is liquid volume divided by free liquid surface 56 (FIG. 1).

Substituting equations (3), (4) and (5) into equation (2):

$$dF/dT = 2c_3\phi xA - 3c_1\phi xA + 3\phi A(V_L/S_L)(c_1-c_2) \quad (6)$$

If the force acting on the pressure sensor is constant, we can set the above expression equal to zero. A and $\phi$ immediately drop out, and we can solve for the depth x:

$$x = (V_L/S_L)\frac{3c_1 - 3c_2}{3c_1 - 2c_3} \quad (7)$$

The depth x at which the force against a float means is constant is approximately equal to the liquid volume over the liquid surface, with only minor adjustments necessary for the coefficients of expansion.

In the case of a horizontal cylindrical tank, the ratio of liquid volume to liquid surface may be expressed as:

$$V_L S_L = D\frac{\phi - \frac{1}{2}\sin 2\phi}{4\sin\phi}. \quad (8)$$

where D is tank diameter, h is liquid height, and $\phi = \cos^{-1}(1 - 2h/D)$.

Therefore, for a horizontal cylindrical tank:

$$x = D \frac{\phi - \frac{1}{2}\sin 2\phi}{4\sin\phi} \left( \frac{3c_1 - 3c_2}{3c_1 - 2c_3} \right) \tag{9}$$

In large tanks, particularly, it is very difficult to measure average liquid temperature with enough accuracy to know whether an observed volume change is due to a leak or to temperature variations. For example, gasoline expands by about one part per thousand for each degree Fahrenheit. In a 4,000 gallon tank, this means 4 gallons per degree. A leak of 1/20 gallons per hour would be masked by a temperature change of 0.0125° F. per hour, *averaged* throughout the entire volume. The larger the tank, the smaller the average temperature change required to mask a given leak rate. In addition, large tanks require more temperature sensing points to give an adequate picture of what the average temperature is.

Specific embodiments of this invention disclosed in the examples and elsewhere are intended to be illustrative only. Variations on the specific embodiments are clear to a person of skill in the art and are intended to be within the scope of this invention.

What is claimed is:

1. A method for determining leaks in a storage tank containing a liquid, said method comprising:

locating a float means initially at a depth in said liquid approximately equal to $V_L/S_L$ where $V_L$ is the volume of said liquid in said tank and $S_L$ is free surface area of said liquid in said tank;

saturating vapor above said liquid in said tank with vapor of said liquid by atomizing so as to fill the vapor above said liquid with small drops of liquid or coating surfaces of said tank above said liquid with a thin layer of said liquid so as to hasten saturation of the vapor above said liquid, so that temperature variation of said liquid in said tank does not change said depth at which said float means floats in said liquid; and determining changes of location of said float means in said tank.

* * * * *